United States Patent [19]

Nairus

[11] Patent Number: 5,418,708
[45] Date of Patent: May 23, 1995

[54] CONSTANT POWER LOAD BANK

[75] Inventor: John G. Nairus, Kettering, Ohio

[73] Assignee: The United States of America as represented by the Secretary of the Air Force, Washington, D.C.

[21] Appl. No.: 257,971

[22] Filed: Jun. 10, 1994

[51] Int. Cl.⁶ .......................................... H02M 3/155
[52] U.S. Cl. .......................................... 363/65; 307/65; 307/82
[58] Field of Search .................. 363/65, 71, 123; 307/58, 82, 65; 324/158 R; 318/67, 807

[56] References Cited

U.S. PATENT DOCUMENTS

| | | | |
|---|---|---|---|
| 3,538,405 | 11/1970 | Borden et al. | 318/67 |
| 3,840,810 | 10/1974 | Fritts et al. | 324/158 R |
| 4,042,830 | 8/1977 | Kellenbenz et al. | 307/40 |
| 4,215,420 | 7/1980 | Kassakian | 364/802 |
| 4,672,159 | 6/1987 | Nilssen | 219/10.55 |
| 5,073,848 | 12/1991 | Steigerwald et al. | 363/65 |

Primary Examiner—Steven L. Stephan
Assistant Examiner—Adolf Berhane
Attorney, Agent, or Firm—Bernard E. Franz; Thomas L. Kundert

[57] ABSTRACT

The constant power load bank is a flexible tool used for simulating avionics loads such as pulsing radars on a 270 VDC power system. The unique feature of this load bank is that it is designed to realistically simulate an active aperture radar with 0–100% of the load pulsing while the remainder of the load is either "on" or "off". The pulse controls are designed to simulate any type of pulsing scenario from simple (one control signal) to complex (multiple control signals simulating incremental load application and removal such as an active aperture radar load). The constant power load bank realistically simulates avionics loads because of the flexible control features and the constant power load itself is composed of actual avionics power supplies.

4 Claims, 4 Drawing Sheets 5,418,708

CONSTANT POWER LOAD BANK

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a constant power load bank to simulate avionics and radar loads on aircraft systems to predict and verify power system stability as a result of constant power loads.

Avionics power supplies for radar systems etc. are designed to maintain constant power, e.g. when the load current changes the voltage also changes to maintain the DC volt-ampere product at a constant value (e.g. they have negative impedance characteristics at their inputs). It has been shown that constant power loading on an aircraft power system can cause the power system to become unstable. Old simulation methods to duplicate this phenomenon include mathematical equations representing the electrical power system including the constant power loads and power system controls. These equations are theoretical and to date have not been able to accurately predict system stability or instability as a result of constant power loading.

The following United States patent is of interest.

U.S. Pat. No. 3,840,810—Fritts et al

The Fritts patent discloses a circuit including semiconductor devices to simulate the characteristic load for high frequency energy generators, such as magnetrons used in microwave oven heating apparatus.

SUMMARY OF THE INVENTION

An objective of the invention is to provide a constant power load bank to simulate avionics and radar loads on aircraft systems to predict and verify power system stability as a result of constant power loads.

The load bank according to the invention offers an inexpensive realistic simulation tool to predict power system stability as a result of constant power loading and perform electrical system diagnostic testing.

The constant power load bank can be used for simulation of avionics loads on an aircraft power system to measure how the loads affect power system stability. Present simulations are done with mathematical models that are good in theory but still require hardware verification. The load bank simulation goes beyond mathematical modeling in that it performs the simulation with hardware thus allowing it to prove or disprove mathematical models to aid in the design of an aircraft power system. The constant power load bank can also be used in the field for electrical power system diagnostic testing on aircraft such as the F-22. The constant power load bank would eliminate the need to use the actual radar system on board the aircraft for electrical power system diagnostic testing. Radar systems have low mean time between failure (MTBF) figures and eliminating the need for diagnostic testing would improve average time between maintenance figures.

DETAILED DESCRIPTION

Figure 1:
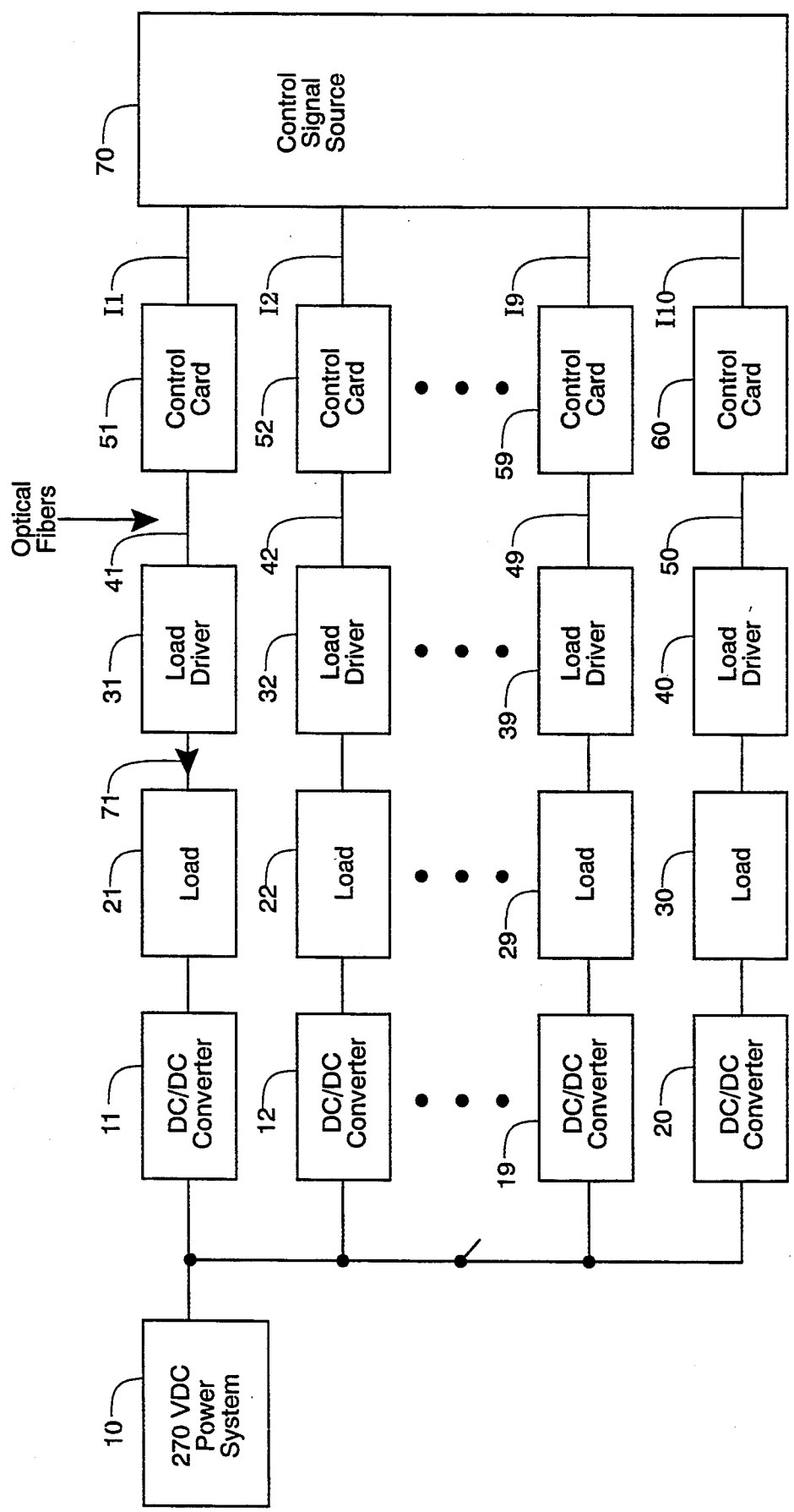
FIG. 1 is a block diagram showing the system with a constant power load bank and control.

FIG. 1 is a block diagram showing the system with a constant power load bank and control means. In a typical embodiment on an aircraft, there may be a 270-volt direct current power supply 10. The constant power load bank comprises a plurality of DC/DC converters with resistance loads, shown here as ten converters 11–20 with respective loads 21–30. Some type of control signal source 70 (a pulse generator) provides control signals on input lines I1–I10 to control cards 51–60, which via optical fibers 41–50 and load drivers 31–40, provide signals to operate switches in loads 21–30.

Figure 1A:
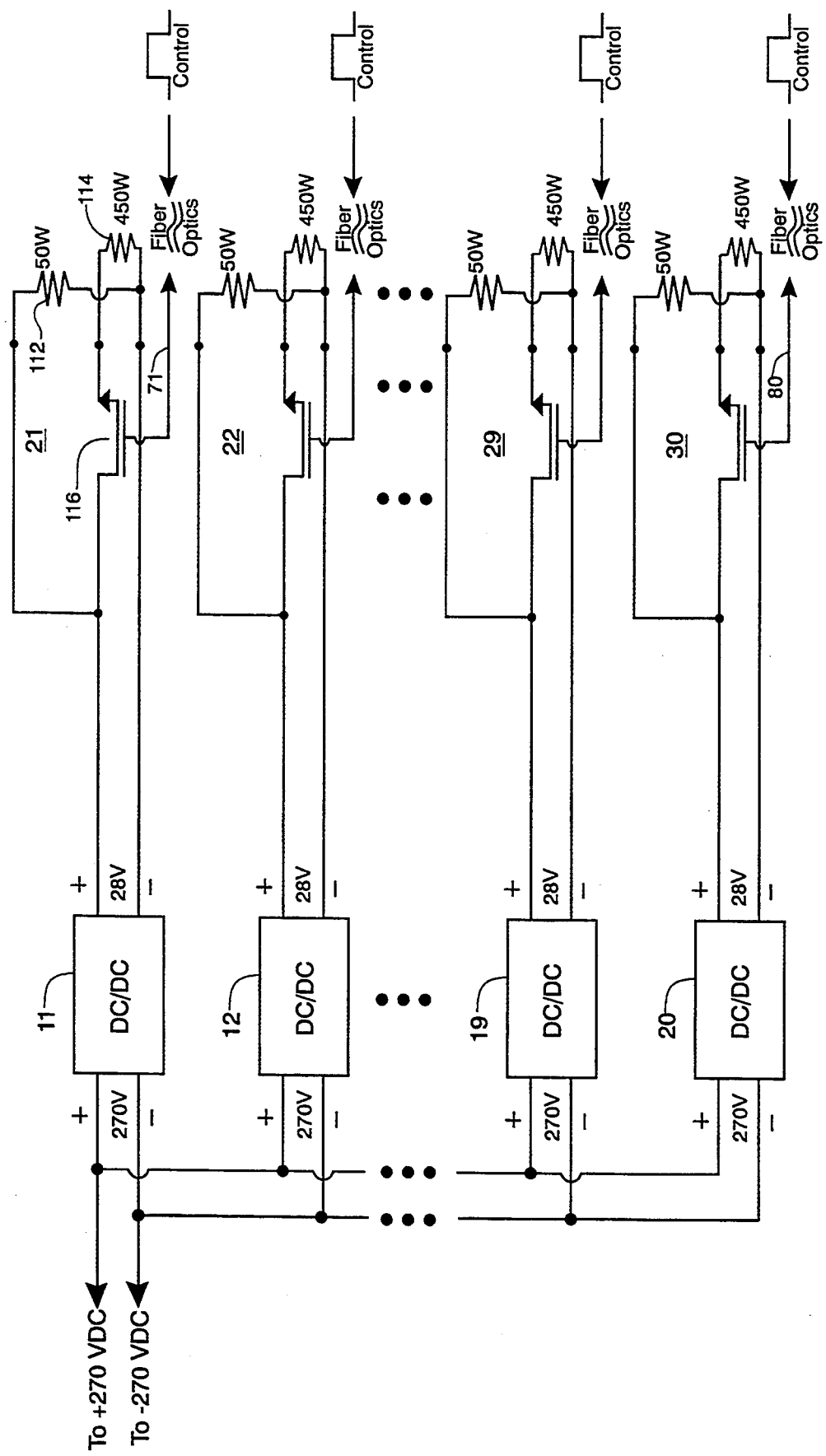
FIG. 1a is a block diagram showing the constant power load bank as it exists today.
Figure 2:
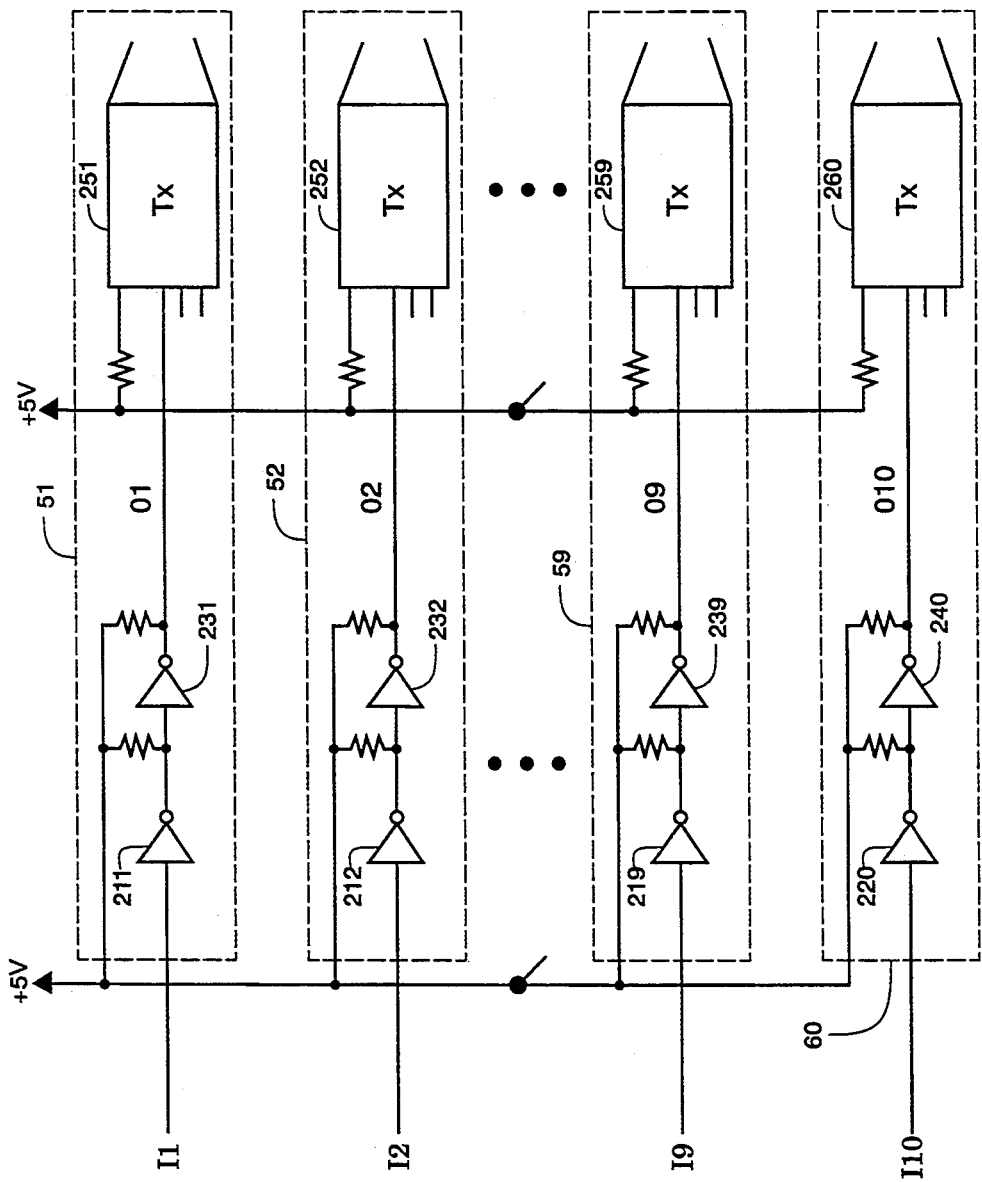
FIG. 2 is a schematic of the control card.

FIG. 1a depicts a block diagram showing the constant power load bank as it exists today. FIG. 2 is a schematic of the control card and FIG. 3 is a schematic of the load driver.

The heart of the load bank is the 270 VDC to 28 VDC DC/DC converters 11–20 which require constant power inputs for operation (e.g. they have negative impedance characteristics at their inputs). These converters (power supplies) are exactly paralleled to be powered from the same 270 VDC source and in their existing configuration require up to 13 KW of 270 VDC constant power. The outputs of each converter have two modes: one is a constant non-switched output to provide steady 28 VDC power while the other output has a controllable solid state switch used to pulse each load which in turn reflects the DC/DC converter constant power effects on the 270 VDC source. In the load 21, the constant load is provided by a 50-watt resistor 112, and the switched load is a 450-watt resistor 114. The solid state switch 116 is a FET transistor. The other loads 22–30 have similar resistors and switches.

The solid state switches are controlled by the optically isolated control cards 51–60. Each of the control cards comprises two type 7405 inverters in tandem driving an optic fiber transmitter. On control card 51 the input line I1 is coupled via inverters 211 and 131 to the output line O1 to the optic transmitter 251; and the control cards 52–60 have similar inverters and transmitters. The output of each of the inverters is connected via a load resistor to +5 volts, and each of the transmitters has an input connected to the +5-volt source. The control cards are designed such that any number of the solid state switches can be controlled from the same pulse generator or each can be individually controlled such as phase control which is a common load pattern for active aperture to simulate complex radar scenarios.

Figure 3:
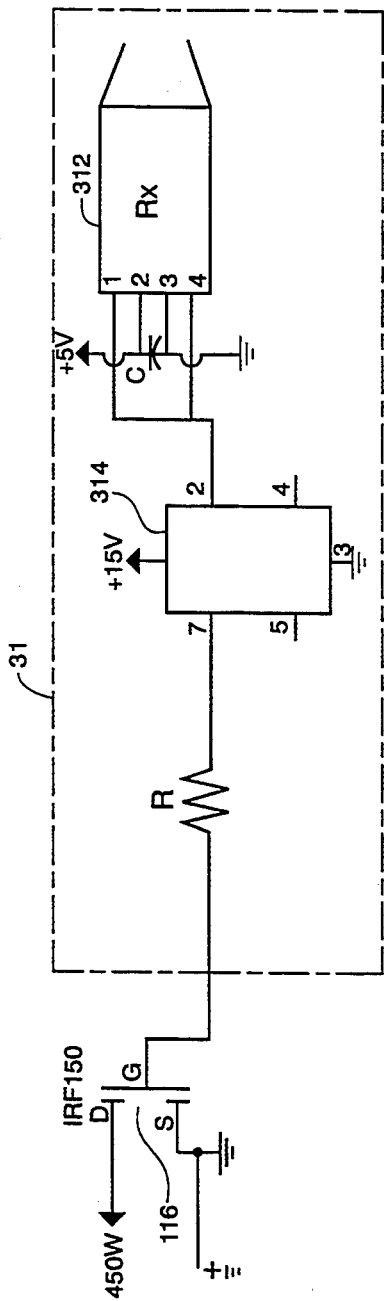
FIG. 3 is a schematic of the load driver.

FIG. 3 is a schematic of one of the load drivers 31. An optic receiver 312 has its output pins 1 and 4 connected to pin 2 of a FET driver IC device type 3626. A capacitor C is connected across pins 2 and 3 of the receiver 312, with pin 2 connected to +5 volts and pin 4 to ground. Pin 7 of the IC device 314 is connected via a resistor R to the gate of the solid state switch 116, type IRF150, in the load 21. The other load drivers 32–40 have similar circuits.

Figure 4:
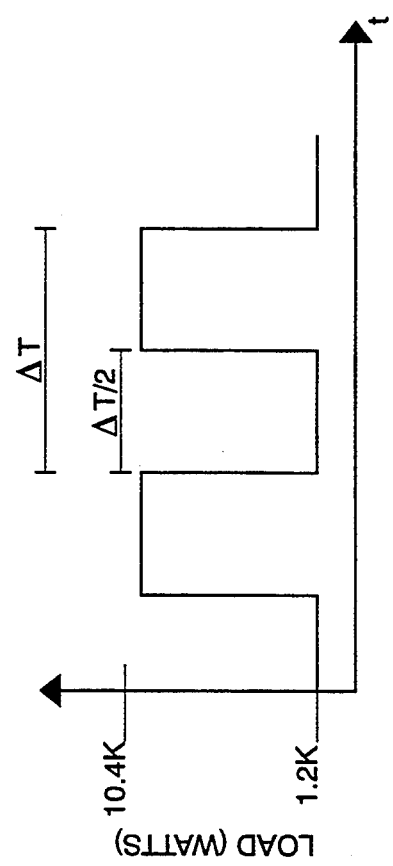
FIG. 4 is a graph showing pulsed load power.

In the present configuration in the laboratory, the DC/DC converters are type Vicor part No. VI-N6L-CM. The resistors such as the 50-watt resistor 112 and the 450-watt resistor 114 presently being used as the individual DC/DC converter output loads are 28 VDC resistors in the form of light bulbs, but the load bank design can accommodate any type of 28 VDC load. To date, the only constant power load bank to be tested has a continuous 1.2 KW constant power load with an additional pulsed 10.4 KW constant power load, as shown in FIG. 4. The control lines were tied together such that the 10.4 KW load was pulsed simultaneously from the same control source. It is also possible to vary the rise and fall times of FIG. 4 which is another feature of this load bank design.

Advantages and New Features

The constant power load bank has advantages over conventional simulation tools in that it is better suited to represent the real power system load scenarios than mathematical models and computer simulations. This constant power load bank is more advanced than existing constant power load banks because it is the only load bank design that utilizes actual avionics power supplies to simulate a constant power load. This constant power load bank is different than the existing constant power load banks because existing designs actually simulate the constant power effect by monitoring voltage and current and adjusting load to keep the product of voltage and current constant. In effect this is a digital representation of an analog process that does not exactly simulate the true constant power effect. The result of the digital representation is a constant power simulator with limited bandwidth and accuracy. The new design is utilizing the actual power supplies for true constant power simulation. The new design is also more flexible than existing constant power loads bank designs because each of the major components (power supplies and loads) are line replaceable and can be readily changed to better represent a specific actual power system constant power load. This load bank can also save maintenance costs on future aircraft since it can be used to perform electrical system diagnostic testing on operational aircraft without using the aircraft's radar system. Not using the radar system will increase average time between repairs which helps reduce maintenance costs.

Alternatives

Different power supplies can also be used which include electromagnetic interference (EMI) filters on each input and/or one large EMI filter could be added at the input to the load bank. The amount of total load in the load bank is also variable. Presently is set for 13 KW of 270 VDC constant power load, but this can be increased or decreased depending on the size and number of the power supplies. More power supplies are easily added by adding more control cards and load drivers to the constant power load bank. The constant power load bank can also be configured for different types of power systems (i.e. 115 VAC/400 Hz) by changing the power supplies. Different control scenarios can also be programmed into the load bank to simulate any scenario (i.e.: to adjust load rise and fall times).

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

I claim:

1. A load bank for simulating constant power loads, wherein said load bank comprises a plurality of DC/DC converters having negative impedance input characteristics which require constant power inputs for operation, said converters being connected in parallel to the same said DC power system, each said converter having an output connected to a first output resistance means to provide steady DC power, and a second output resistance means connected to the converter output via a solid state switch of a fully controlled type which can be turned on or off at any time, and control means for the solid state switch of each said converter for turning the solid state switch on and off to simulate a pulsing load.

2. A load bank according to claim 1, wherein the DC/DC converters are of the same type as used with an actual load which is being simulated, and wherein the control means includes optical means for coupling a source of control signals including pulse generators to the solid state switches, for optical isolation.

3. A load bank according to claim 2,
wherein the solid state switches are FET transistors; and
wherein each control means comprises an optical transmitter having a control input coupled to the source of control signals, an optical fiber coupled to the optical transmitter, a load driver having an optical receiver coupled to the optical fiber and an electrical device coupled between the optical receiver and one of the solid state switches, so that any number of said solid state switches can be controlled from the same pulse generator or each can be individually controlled such as phase control which is a common load pattern for active aperture to simulate complex radar scenarios.

4. A load bank for simulating constant power loads, wherein said load bank comprises a plurality of DC/DC converters having negative impedance input characteristics which require constant power inputs for operation, said converters being connected in parallel to the same said DC power system, each said converter having an output connected to a first output resistance means to provide steady DC power, and a second output resistance means connected to the converter output via a solid state switch which is a FET transistor which can be turned on or off at any time, and control means for the solid state switch of each said converter for turning the solid state switch on and off to simulate a pulsing load;
wherein a control signal source includes pulse generator means for providing control signals on a plurality of input lines, and the control means for each solid state switch includes an optical fiber line coupled between one of the input lines and one of the solid state switches; and
wherein the control means are designed such that any number of said solid state switches can be controlled from the same pulse generator or each can be individually controlled such as phase control which is a common load pattern for active aperture to simulate complex radar scenarios.

* * * * *